US006065797A

United States Patent [19]

Shirasaka

[11] Patent Number: 6,065,797

[45] Date of Patent: May 23, 2000

[54] LOCKING MECHANISM OF DOOR LOCKING APPARATUS FOR MOTOR VEHICLE

[75] Inventor: Yuuichi Shirasaka, Tokyo, Japan

[73] Assignee: Fuji Jukogyo Kabushiki Kaisha, Tokyo, Japan

[21] Appl. No.: 09/144,198

[22] Filed: Aug. 31, 1998

[30] Foreign Application Priority Data

Sep. 10, 1997 [JP] Japan .................................. 9-262654

[51] Int. Cl.7 .................................................. B60J 5/00

[52] U.S. Cl. .................................. 296/146.6; 296/146.1; 292/DIG. 65

[58] Field of Search .................................. 296/188, 189, 296/146.6, 146.9, 146.4, 146.1; 49/503; 292/DIG. 65, DIG. 41, 216

[56] References Cited

U.S. PATENT DOCUMENTS

| | | | |
|---|---|---|---|
| 3,713,691 | 1/1973 | Bayless | 292/DIG. 65 |
| 3,799,596 | 3/1974 | Nozoma et al. | 292/216 |
| 4,627,649 | 12/1986 | Leplat | 292/DIG. 65 |
| 4,709,950 | 12/1987 | Zortman | 292/DIG. 65 |
| 4,829,713 | 5/1989 | Bozyk et al. | 49/503 |
| 5,026,100 | 6/1991 | Hulkenberg, Jr. | 292/DIG. 65 |
| 5,238,274 | 8/1993 | Becker et al. | 292/216 |
| 5,417,470 | 5/1995 | Holt | 296/146.6 |
| 5,600,931 | 2/1997 | Johnson | 296/146.6 |
| 5,752,346 | 5/1998 | Kritzler et al. | 49/503 |
| 5,755,484 | 5/1998 | Chou et al. | 296/146.6 |
| 5,769,471 | 6/1998 | Suzuki et al. | 292/216 |
| 5,785,376 | 7/1998 | Nees et al. | 296/146.6 |
| 5,799,516 | 9/1998 | Zintler | 292/DIG. 65 |
| 5,800,007 | 9/1998 | Cho | 49/503 |
| 5,813,718 | 9/1998 | Masuda et al. | 296/146.6 |
| 5,868,456 | 2/1999 | Kowalski et al. | 296/146.6 |
| 5,927,794 | 7/1999 | Mobius et al. | 296/146.1 |

FOREIGN PATENT DOCUMENTS

| | | | |
|---|---|---|---|
| 6-32648 | 9/1928 | Japan . | |
| 404300714 | 10/1992 | Japan | 296/146.6 |
| 405169974 | 6/1993 | Japan | 296/146.6 |

*Primary Examiner*—Joseph D. Pape
*Assistant Examiner*—Kiran Patel
*Attorney, Agent, or Firm*—Smith, Gambrell & Russell, LLP

[57] ABSTRACT

A vehicle door having an outer panel, an inner panel, a reinforcement provided between the outer and inner panels for absorbing a side impact and a door locking apparatus including a lock lever for changeover the vehicle door from a locking condition to an unlocking condition and vise versa, comprises a bracket for securing the reinforcement to the outer panel, a cam-shaped projection provided on the bracket and an end portion of the lock lever opposedly close to the cam-shaped projection for rotating the lock lever so as to changeover from the locking condition to the unlocking condition, in the event of a sideways collision, when the reinforcement is deformed inwardly and as a result the cam-shaped projection strikes the end portion of the lock lever. Thus constituted door locking apparatus enables to rescue a passenger caught in a car through a door unlocked.

7 Claims, 2 Drawing Sheets

LOCKING MECHANISM OF DOOR LOCKING APPARATUS FOR MOTOR VEHICLE

BACKGROUND OF THE INVENTION

1. Field of the Invention

The present invention relates to a door locking apparatus for a motor vehicle and more particularly to a locking mechanism of a door locking apparatus.

2. Prior Arts

The door locking apparatus comprises a latch plate engaging with a striker secured to the vehicle body, a detent lever engaging with a pawl of the latch plate to hold an engagement condition with the latch plate, an operating lever for operating the detent lever in the direction of disengaging with the pawl of the latch plate when an outer handle or inner handle is operated and a locking mechanism for disabling a disengagement with the pawl even when the outer or inner handle is operated.

With respect to the locking mechanism, a so-called "idle lock type" locking mechanism has been generally used. This type of the locking mechanism is constituted such that an unlocking condition where the operating lever is connected with the detent lever is changed over to a locking condition where the operating lever is disconnected with the detent lever by use of a lock lever. The changeover from the unlocking condition to the locking condition of the lock lever is performed by operating an inner lock lever from inside of the vehicle or turning a key from outside of the vehicle.

When the locking mechanism of the door locking apparatus is in the locking condition, it is constituted such that the door will not open from outside of the vehicle. This causes a problem that a passenger trapped in a car can not be rescued readily due to the broken locking mechanism when the vehicle has a collision, especially when it has a side impact. Further, even if the locking mechanism is in the unlocking condition, there is a possibility that the locking mechanism turns to the locking condition due to an external force applied to the engaging mechanism between the inner lock lever and the lock lever, resulting in taking time to rescue the passenger.

Japanese Utility Model Application Laid-open No. Jitsu-Kai-Hei 4-98972 discloses a technique in which a door lock switch is provided with an impact sensing device for changing over the locking mechanism to the unlocking condition, when a large impact is given to the vehicle body, by returning a movable contact to a fixed contact side. Further, Japanese Utility Model Application Laid-open No. Jitsu-Kai-Hei 6-32648 discloses a technique in which, when an impact is detected by an impact sensor, a control section raises a signal for operating an actuator and the locking mechanism is changed over into the unlocking condition by the operation of this actuator.

However, these prior arts need expensive components such as an impact sensor, an impact sensing mechanism, and an electrically operated actuator and the like. Further, these techniques have an uncertainty about such cases where an impact by collision or a deformation of the body or the door may cause a disconnection in the electrical circuits or other electrical failures.

SUMMARY OF THE INVENTION

The object of the invention is to provide a door locking apparatus capable of holding a door in an unlocking condition so as to rescue a passenger readily therethrough when the door is deformed by a large lateral impact applied thereto.

The door locking apparatus according to the present invention includes a reinforcement provided in door panels, a lock lever for changing over the vehicle door either in a locking condition or in an unlocking condition, a bracket for securing the reinforcement to the door panels, a cam-shaped projection provided on the bracket and an end portion of the lock lever opposedly close to the cam-shaped projection for rotating the lock lever so as to change from the locking condition to the unlocking condition, when the reinforcement is deformed inwardly and as a result the cam-shaped projection strikes the end portion of the lock lever.

DETAILED DESCRIPTION OF THE PREFERRED EMBODIMENT

Figure 1A:
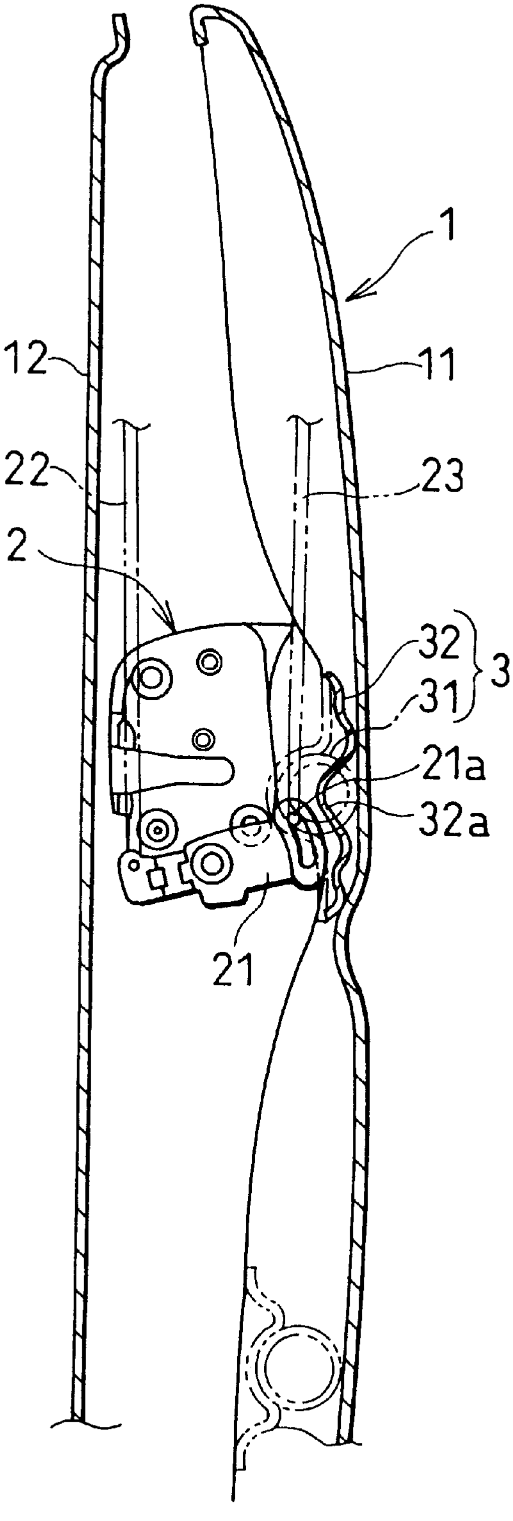
FIG. 1*a* is a sectional view of a door in a before-impact condition according to an embodiment of the present invention.

Referring now to FIG. 1, reference numeral 1 denotes a door of a vehicle which is composed of an outer panel 11 and an inner panel 12. The door 1 is hinged at the upper and lower portions of the front end thereof to the body (pillar) and is provided with a door locking apparatus 2 at the rear end thereof.

The door locking apparatus basically comprises a latch plate engaging with a striker secured to the vehicle body, a detent lever engaging with a pawl of the latch plate to hold an engagement condition with the latch plate, an operating lever for operating the detent lever in the disengaging direction with the pawl of the latch plate when an outer handle or inner handle is operated and a locking mechanism for holding a locking condition, that is, a condition where the engagement with the pawl can not released, even when the outer or inner handle is operated. These major components and mechanisms are well known, therefore, detailed descriptions and illustrations will be omitted. With respect to the locking mechanism, in this embodiment, a so-called "idle lock type" locking mechanism is used. This type of the locking mechanism has a lock lever 21 for changing over between an unlocking condition in which the operating lever is connected with the detent lever and a locking condition in which the operating lever is disconnected with the detent lever. This "idle lock type" locking mechanism is also well known, consequently detailed description and illustrations will be omitted. The lock lever 21 is held at a locking position or an unlocking position with a click stop feeling retained by a reversing spring (not shown), respectively and the changeover of the locking lever 21 from the locking position to the unlocking position and vise versa is performed by an operation of an inner lock lever from inside of the vehicle or by an operation of a key from outside of the vehicle. In the drawing, reference numeral 22 denotes a rod for interconnecting the inner lock lever with the lock lever 21 and reference numeral 23 denotes a rod for interconnecting the lock lever 21 with a key lock lever (not shown) which is turned by a key operation.

Numeral 3 denotes a reinforcement provided longitudinally with respect to the door 1 along the inner side of the outer panel 11 for raising a resistance of the door 1 against a side impact to reduce the amount of protrusion due to the deformation of the door 1 towards the passenger compartment.

The reinforcement 3 is composed of a pipe-shaped beam 31 and brackets 32, 32 for securing the beam 31 to the outer panel 11 at both ends of the beam 31.

In the present invention, the door locking apparatus 2 is disposed opposedly to the bracket 32 (in this embodiment, the bracket on the rear side of the vehicle). The bracket 32 has a cam-shaped projection 32*a* whose outer surface is opposed to an end portion 21*a* of the lock lever 21 as shown in FIG. 1*a*.

Figure 1B:
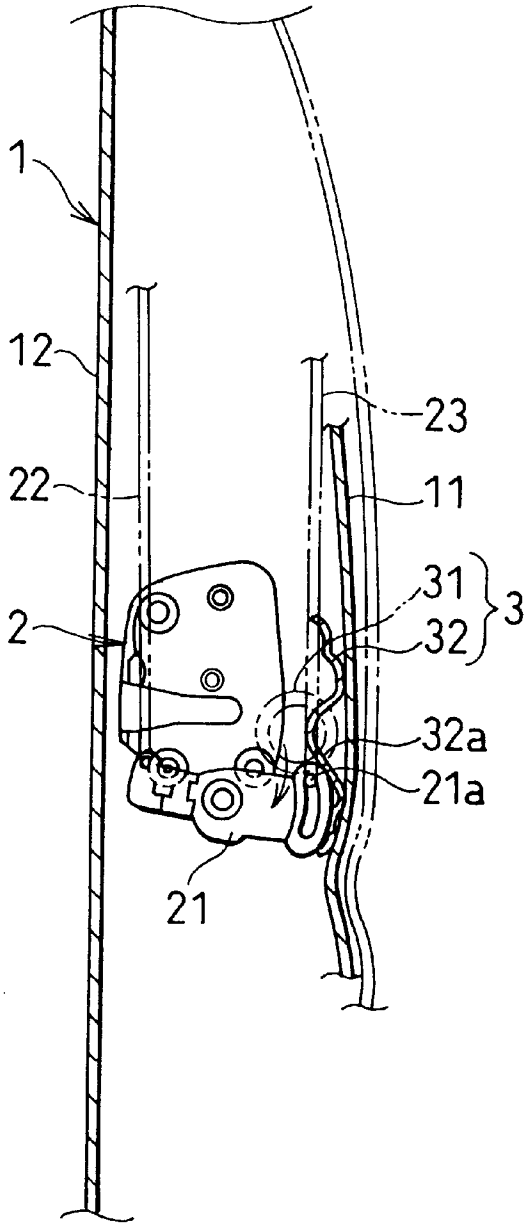
FIG. 1*b* is a sectional view of a door in an after-impact condition according to an embodiment of the present invention.
Figure 2A:
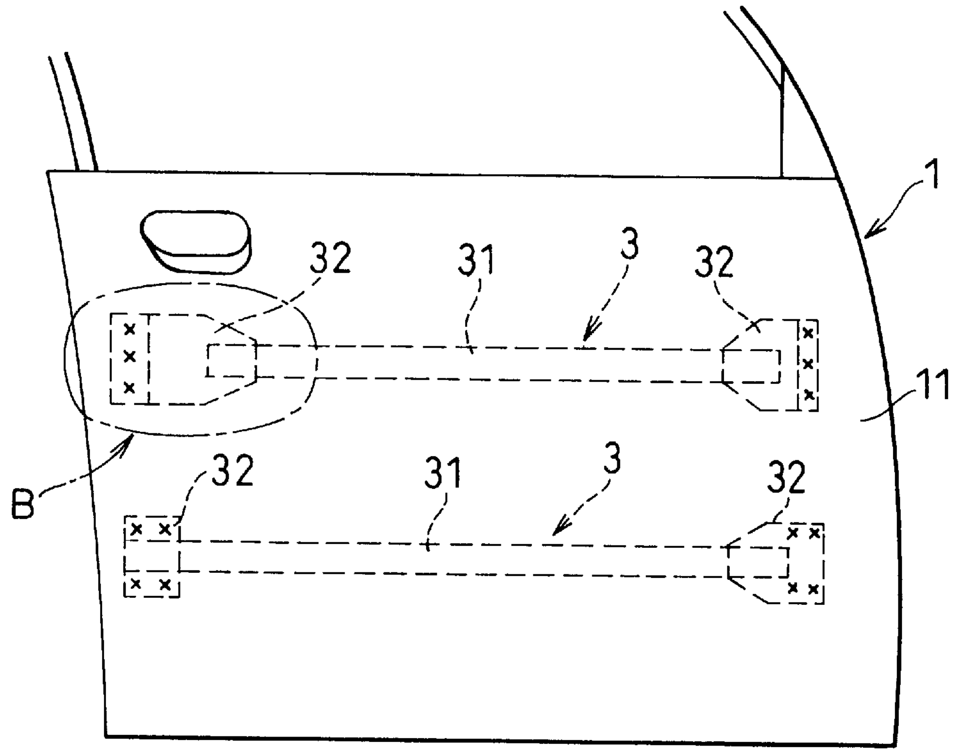
FIG. 2*a* is a front view of a door shown in FIG. 1*a*.
Figure 2B:
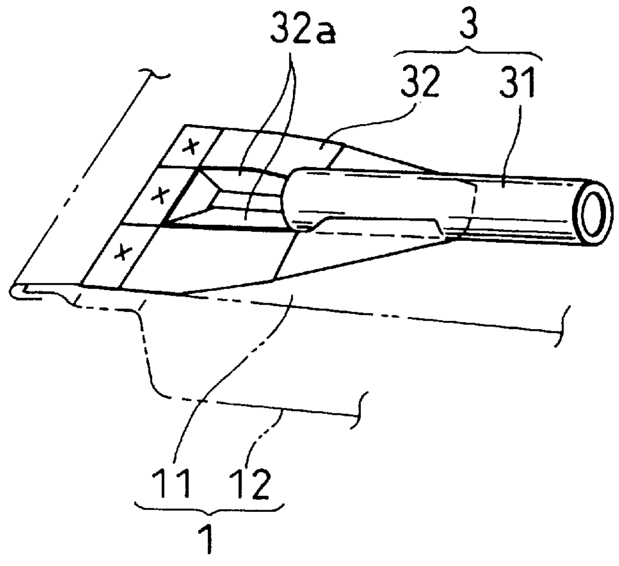
FIG. 2*b* is a perspective enlarged view of a reinforcement shown in a portion "B" of FIG. 2*a*.

When the door 1 has a large load sideways and is deformed inwardly, the bracket 3 of the reinforcement 3 is also deformed inwardly. At this time, the cam-shaped projection 32*a* strikes the roundly shaped end portion 21*a* of the lock lever 21. When the cam-shaped projection 32*a* pushing on along its inclined surface, the end portion 21*a* rotates from the locking direction to the unlocking direction, that is, in the downward direction in FIG. 1 and finally the lock lever 21 obtains an unlocking position, as shown in FIG. 1*b*. In this case, when the lock lever 21 rotates slightly in the unlocking direction, since the biasing force of the reversing spring (not shown) holds the unlocking position of the lock lever 21, the door locking apparatus 2 is changed over to the unlocking condition with a small amount of the deformation of the bracket 32 and is held in the unlocking condition. Thus, when a car accident happens, the door 1 is securely held at an unlocked condition so as to enable a quick rescue of a passenger trapped in a vehicle therethrough.

In order to make the rotation of the lock lever 21 easier, either the contact surface of the cam-shaped projection 32*a* or that of the end portion 21*a* of the lock lever 21 or both of them may be coated with synthetic resin for smooth sliding. Further, the lock lever 21 itself or the bracket 32 itself may be fabricated of synthetic resin.

In this embodiment, two sets of the reinforcement 3, 3 are provided at the upper and lower portions of the door 1 respectively and the upper one is used for the purpose of the present invention. The number of the reinforcement 3 is arbitrary. Any of the bracket 32 can be provided with a cam-shaped projection 32*a*.

Further, in this embodiment, the locking mechanism is applied to the idle lock type but it may include any type of the locking mechanism which can be changed over between the locking and unlocking conditions by operating the lock lever 21.

In summary, according to the present invention, when a vehicle has a side impact, the lock lever can easily turn to an unlocking condition, that is, a condition in which the door stay unlocked, by employing existing components without using expensive devices such as an impact sensor or an electric actuator. Further, since the door locking mechanism according to the present invention has a simple construction, a low cost and practicable door locking apparatus having a fail safe unlocking mechanism can be realized.

While the presently preferred embodiment of the present invention has been shown and described, it is to be understood that this disclosure is for the purpose of illustration and that various changes and modifications may be made without departing from the scope of the invention as set forth in the appended claim.

What is claimed is:

1. A vehicle door having an outer panel, an inner panel, a reinforcement provided between said outer and inner panels for absorbing a side impact and a door locking apparatus including a lock lever for selectively changing over said vehicle door from a locking condition to an unlocking condition and vise versa, said vehicle door comprising:

a bracket member for engaging said reinforcement with said outer panel, said bracket member having an operating portion which is brought into contact with said lock lever so as to change from said locking condition of said lock lever to said unlocking condition thereof, when said reinforcement is deformed by the side impact.

2. A vehicle door having an outer panel, an inner panel, a reinforcement provided between said outer and inner panels for absorbing a side impact and a door locking apparatus including a lock lever for selectively changing over said vehicle door from a locking condition to an unlocking condition and vise versa, comprising:

a bracket for securing said reinforcement to said outer panel;

a cam-shaped projection provided on said bracket and movable inwardly when said reinforcement is deformed; and an end portion of said lock lever opposedly close to said cam-shaped projection for rotating said lock lever in the direction of changing over from said locking condition to said unlocking condition and for holding said vehicle door in said unlocking condition when said reinforcement is deformed inwardly and as a result said cam-shaped projection strikes said end portion.

3. The vehicle door according to claim 2, wherein said cam-shaped projection of said bracket has its surface coated with a synthetic resin layer.

4. The vehicle door according to claim 2, wherein said end portion of said lock lever has its surface coated with a synthetic resin layer.

5. An unlocking mechanism of a locking apparatus provided between an outer panel and an inner panel of a door of a vehicle having, a reinforcing beam attached on an inside surface of said outer panel via a pair of brackets at both ends thereof respectively for extending in a running direction of said vehicle, a lock lever hinged on a side of said locking apparatus for keeping said door in a locked condition by rotation thereof, a first rod mechanically and rotatably connected at a first end of said lock lever adjacent said outer panel for locking and unlocking said door, and a second rod mechanically and rotatably connected at a second end of said lock lever for locking and unlocking said door, comprising:

an end portion formed on said first end of said lock lever and provided to be touchable to an inside surface of one of said pair of brackets; and a cam portion formed on said inside surface of one of said pair of brackets for pushing said end portion of said lock lever to rotate said lock lever in an unlocked condition when said door of said vehicle has a side impact in a collision.

6. The unlocking mechanism according to claim 5, wherein:

said cam portion is an inclined surface for easily rotating said lock lever to said unlocked condition by pushing said end portion thereof with said inclined surface.

7. An unlocking mechanism for vehicle door, comprising:

a door locking apparatus including a lock lever for selectively changing over said vehicle door from a locking condition to an unlocking condition and vise versa, and provided in between an inner panel and an outer panel of said vehicle door; and a bracket provided on said outer panel of said vehicle door and having a projection for striking said lock lever so as to rotate said lock lever in the direction of changing over from said locking condition to said unlocking condition when said vehicle door is deformed inwardly by a side impact from the outer side.

* * * * *